United States Patent [19]

Quick

[11] Patent Number: 4,843,912

[45] Date of Patent: Jul. 4, 1989

[54] VARIABLE STIFFNESS SUPPORT RING

[75] Inventor: David C. Quick, Rockford, Ill.

[73] Assignee: Sundstrand Corp., Rockford, Ill.

[21] Appl. No.: 211,248

[22] Filed: Jun. 24, 1988

[51] Int. Cl.⁴ .............................................. F16H 1/28
[52] U.S. Cl. ........................................ 74/801; 74/409
[58] Field of Search .......................... 74/801, 409, 410

[56] References Cited

U.S. PATENT DOCUMENTS

| | | | |
|---|---|---|---|
| 2,768,698 | 10/1956 | Fabian | 180/43 |
| 3,030,784 | 4/1962 | Minik | 64/18 |
| 3,258,995 | 7/1966 | Bennett et al. | 74/801 |
| 3,383,954 | 5/1968 | McFarland | 74/753 |
| 3,633,441 | 1/1972 | Hicks | 74/801 |
| 3,640,150 | 2/1972 | Leiner et al. | 74/801 X |
| 3,952,546 | 4/1976 | Nakano et al. | 64/27 NM |
| 4,384,498 | 5/1983 | Eichinger | 74/785 |
| 4,395,809 | 8/1983 | Whiteley | 29/451 |
| 4,654,951 | 4/1987 | Myer | 29/453 |
| 4,674,351 | 6/1987 | Byrd | 74/443 |
| 4,751,855 | 6/1988 | Hudson et al. | 74/801 |

Primary Examiner—Dirk Wright
Attorney, Agent, or Firm—Antonelli, Terry & Wands

[57] ABSTRACT

An improved support ring (50) is disclosed for supporting a plurality of planetary gear sets (20) which are driven by a centrally disposed input shaft (12) having a sun gear (16) attached thereto in which the planetary gear sets are subject to radially inward loads. The support ring (50) includes an inner ring (52) and an outer ring (57). The inner ring (52) has a bore (54) which is disposed around the input shaft (12) and an outside surface (56) and the outer ring (57) has a bore (58) with a diameter greater than the diameter of the outside surface of the inner ring. The outside surface (60) of the outer ring rotatably supports the planetary gear sets (20). Preferably, the outer ring (57) has a spring rate which is less than the inner ring (52) to readily permit absorption of radial loads when the outer ring does not contact the inner ring. A retaining ring (62) may be provided to maintain a fixed axial relationship between the inner (52) and outer rings (57).

19 Claims, 2 Drawing Sheets

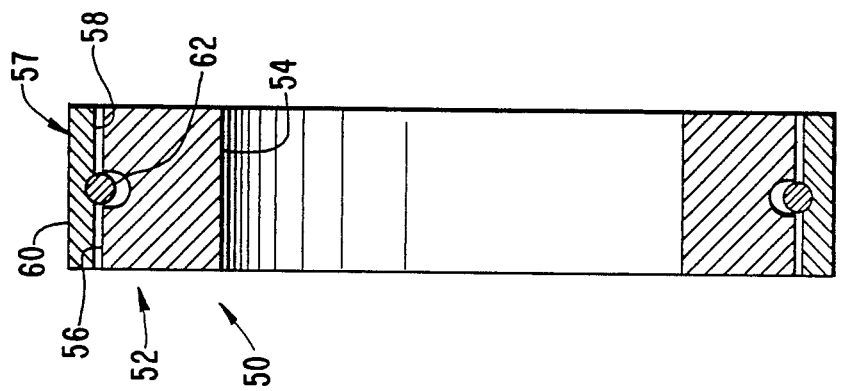
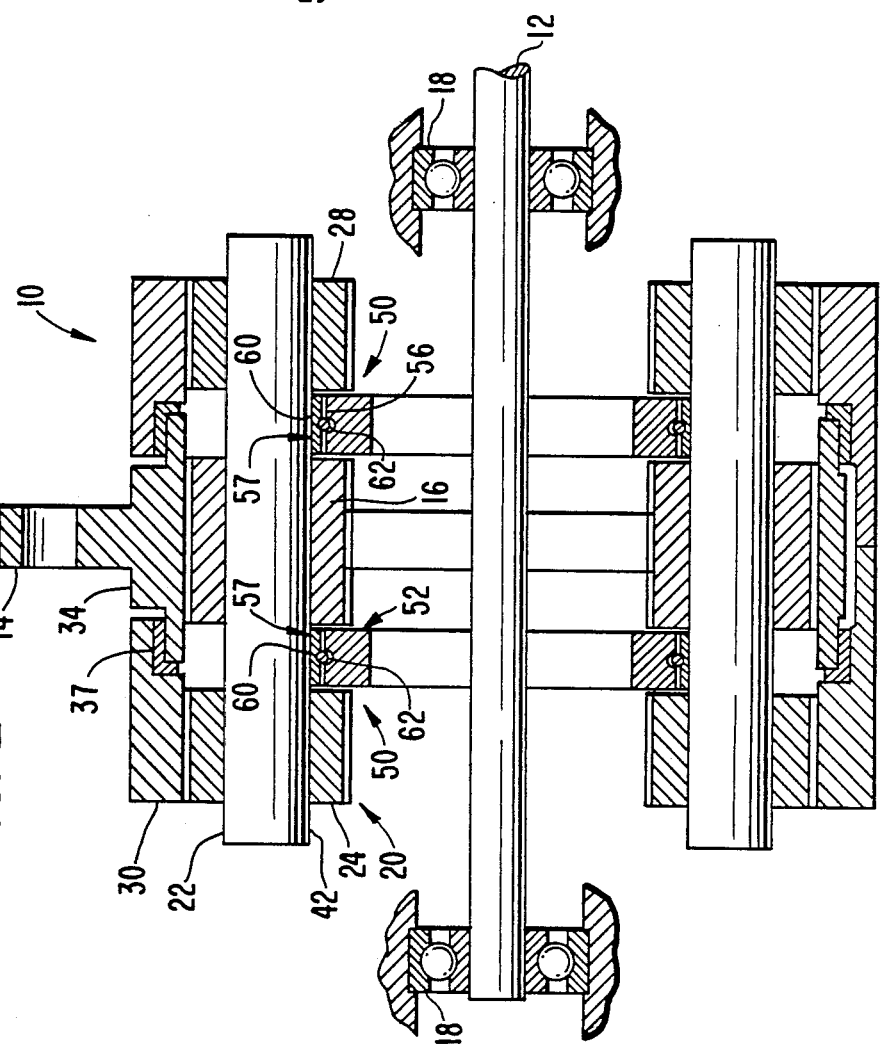

VARIABLE STIFFNESS SUPPORT RING

TECHNICAL FIELD

The present invention relates to geared rotary actuators and more particularly to support rings for geared rotary actuators.

BACKGROUND ART

FIG. 1 illustrates a conceptual diagram of a prior art geared rotary actuator which has been manufactured by the assignee of the present invention. The geared rotary actuator 10 functions to transmit input torque applied to input shaft 12 to an output actuator 14 of the type which has been used to activate the control surfaces of an airplane. In order to maintain precise control of the aircraft in flight, it is necessary that the amount of backlash between the input shaft 12 and the actuator 14 be minimized. Torque from the shaft 12 is transmitted to sun gear 16. The shaft 12 is supported by a pair of bearings 18. A plurality of planetary gear sets 20 are radially disposed with respect to the input shaft 12 and evenly circumferentially spaced around the sun gear 16. Each of the planetary gear sets 20 includes a support shaft 22 to which are mounted first, second and third planetary gears 24, 26 and 28, respectively. While the gears 24, 26 and 28 have been illustrated as separate parts, it should be understood that the shaft 22 is typically integral with the aforementioned gears. The first and second planetary gears 24 and 28 respectively mesh with fixed first and second ring gears 30 and 32, respectively which are rotatably supported by bearings 37. The third planetary gear 26 meshes with a third ring gear 34 which is rotatably supported by bearings 36.

First and second annular support rings 36 and 38 rotatably support the support shafts 22 of the planetary gear sets 20. The first and second support rings are solid. Each of the support rings 36 and 38 has an annulus which has an inner diameter substantially larger than the input shaft 12 so that the support rings only function to provide radial spacing of the planetary gears and do not transfer load to shaft 12. Outer surface 40 of the first and second support rings 36 and 38 rotatably supports the outer surface 42 of the support shafts 22.

The actuator 14 is caused to rotate with respect to the fixed ring gears 30 and 32 as a consequence of the ring gear 34 having a different pitch diameter than the pitch diameter of the ring gears 30 and 32. Each of the planetary gears 24, 26 and 28 has a pitch diameter designed to mate with each respective ring gear which causes the aforementioned motion of actuator 14 which, as described above, has been used to power the movement of control surfaces of an airplane.

The prior art actuator described above has deficiencies which are caused by the solid support rings 36 and 38. In the geared rotary actuator described above, the planetary gears 24, 26 and 28 are supported by the support rings 36 and 38 by means of the support rings rotatably supporting the support shafts 22 to which the planetary gears are attached. When a torque is applied to the planetary gears, a load is developed at the planetary gear teeth having both radial and tangential components. The radial load is resisted by the support rings which hold the planetary gears in mesh with the ring gears. The solid support rings are relatively stiff and do not substantially deflect inward in response to radial loads. Depending upon the torsional free play requirement of the actuator 14, the gears may be assembled with very little backlash at the planetary to ring gear teeth meshes. This backlash is controlled by the outside diameter of the support rings 36 and 38. The larger the support ring, the smaller the backlash and torsional free play. However, if the backlash between the teeth of the ring gears and the planetary gears is less than the clearance between the second ring gear 34 and the bearing 37, the planetary gears will carry the shear load. It is preferable that the radial load be transferred to the bearings 37 than to the teeth of the planetary gears 24, 26 and 28. As a consequence of the assemblage of the aforementioned rotary actuator with a small backlash, high shear loads applied to the teeth of the planetary gears 24, 26 and 28 have caused damage to the teeth of the planetary gears which increases the backlash between the input shaft 12 and the rotary actuator 14 which lessens precise control of flight surfaces. Any increase in backlash consequent from damage to the teeth of the planetary gears results in lessening of the ability to precisely control the positioning of the control surfaces of the airplane.

U.S. Pat. No. 4,384,498 discloses a deformable inner ring gear which meshes with a plurality of radially inwardly disposed planetary gears for the purpose of load balance consequent from deviations caused by manufacturing or loads applied to an external housing.

U.S. Pat. No. 4,674,351, which is assigned to the assignee of the present invention, discloses a compliant gear. A compliant laminate is disposed between a hub portion and a rim portion of the gear with the laminate including a rigid laminar shim sandwiched between a pair of elastomer layers.

DISCLOSURE OF INVENTION

The present invention provides an improved ring support which prevents the application of high loads to the teeth of planetary gears contained in a geared rotary actuator. The present invention permits the planetary gears to move radially when a torque is applied and permits a clearance to develop on a backside of the gear teeth facing radially outward so that when a shear load is applied to the output ring gear, the ring gear is free to move radially inward by an amount determined by the bearing rotatably supporting the output ring gear so that the bearing and not the planetary gears carry the shear load. The foregoing performance is achieved by providing a support ring set having an inner ring with a bore centrally disposed around the input shaft of the rotary geared actuator and an outside surface with a first diameter, and an outer ring having a bore having a second diameter which is larger than the first diameter and an outer surface which rotatably supports support shafts for planetary gear sets.

A support ring set for use in an actuator in which at least a pair of support ring sets are centrally disposed around an input shaft having a drive for driving a plurality of planetary shafts radially disposed with respect to the input shaft with an outer surface of the support ring sets rotatably supporting the planetary shafts with each shaft having a drive for driving an output which is subject to radially inward loading which results in radially inward force being applied to the planetary shafts in accordance with the invention includes an inner ring having a bore centrally disposed around the input shaft and an outside surface having an outside diameter; and an outer ring having a bore with a diameter which is larger than the outside diameter of the inner ring with an outer surface of the inner ring being the outer surface of the support ring set. The outer ring has a spring rate less than a spring rate of the inner ring; and the inner and outer rings are metallic. A retaining ring is disposed between the inner and outer rings for maintaining an axial relationship between the rings.

An actuator in accordance with the invention includes a rotatably supported centrally disposed shaft; a plurality of planetary shafts radially disposed about the centrally disposed shaft at circumferentially separated positions. A plurality of support ring sets are provided each having an inner ring having a bore disposed around the centrally disposed shaft and an outer surface with a diameter and an outer ring having a bore with a diameter larger than the diameter of the outside surface of the inner ring and an outside surface which rotatably supports the planetary shafts; a coupling mechanism coupling the centrally disposed shaft to the planetary shafts for transmitting torque therebetween; an output, coupled to the planetary shafts for outputting motion in response to relative motion between the centrally disposed shaft and the planetary shafts. The output is mechanically coupled to the planetary shafts and the input torque is applied to the centrally disposed shaft. The inner ring has a first spring rate and the outer ring has a second spring rate with the second spring rate being less than or equal to the first spring rate. Furthermore, the actuator includes one or more bearings rotatably supporting the output with each of the one or more bearings having a nominal clearance from the output and wherein; the output has a backlash; and the backlash is less than the nominal clearance.

A geared rotary actuator in accordance with the invention includes an input shaft having a sun gear mounted thereon; a first fixed ring gear having internally facing teeth; a second fixed ring gear having internally facing teeth; a third ring gear having internally facing teeth with a third ring gear being journalled for rotation; a plurality of planetary gear sets each having first, second and third individual planetary gears mounted at spaced apart locations on a support shaft with the first ring gear having teeth engaging teeth of the first planetary gear of each of the planetary gear sets, the second ring gear having teeth engaging the teeth of the second planetary gear of each of the planetary gear sets and the third ring gear having teeth engaging teeth of the third planetary gear of each of the planetary gear sets; and a plurality of support ring sets with each ring set having an inner ring and an outer ring and each ring set being centrally disposed around the input shaft with at least one support ring set being disposed on each side of the sun gear, and an outer surface of the outer ring of each support ring set rotatably supporting the support shafts of the planetary gear sets, the outside diameter of the inner ring being less than an inside diameter of the outer ring and an inside surface of the inner ring being disposed around an outer surface of the input shaft. Furthermore, an output is provided which is coupled to the third ring gear for outputting motion of the third ring gear and wherein the first and second ring gears have a first pitch diameter and the third ring gear has a second pitch diameter different than the first pitch diameter. The outer ring is metallic and has a first spring rate; and the inner ring is metallic and has a second spring rate which is greater than the first spring rate. Furthermore, a retaining ring is disposed between the inner and outer rings for maintaining an axial relationship between the inner and outer support rings. One or more bearings are provided which rotatably support the third ring gear with each of the one or more bearings having a nominal clearance from the third ring gear; and wherein the second planetary gears have a nominal backlash measured with respect to the second ring gear and the nominal backlash is less than the nominal clearance.

BRIEF DESCRIPTION OF DRAWINGS

FIG. 2 illustrates a geared rotary actuator in accordance with the present invention.

FIG. 3 illustrates a cross sectional view of a support ring set of the present invention which is drawn to a different scale than FIG. 2.

BEST MODE FOR CARRYING OUT THE INVENTION

Figure 1:
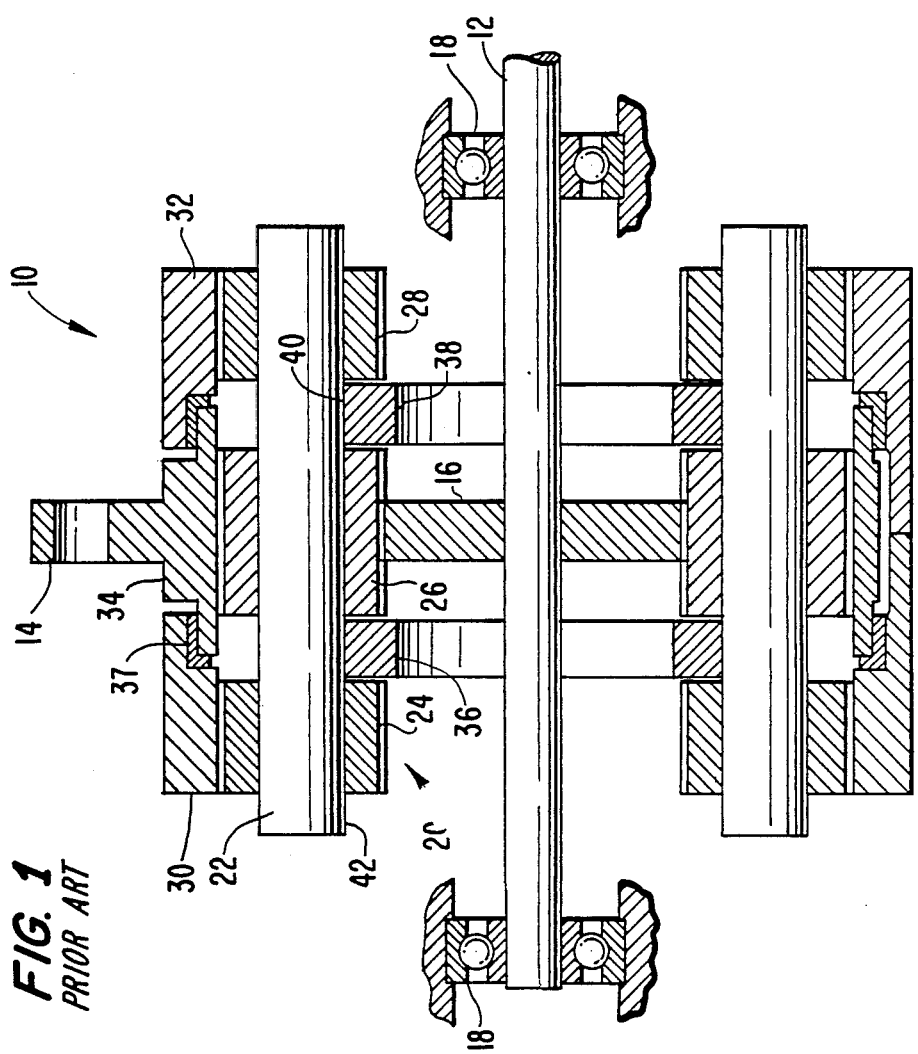
FIG. 1 illustrates a conceptual block diagram of a prior art geared rotary actuator which has been sold by the assignee of the present invention.

FIG. 2 illustrates a geared rotary actuator 10 in accordance with the present invention. Like reference numerals identify like parts in FIGS. 1 and 2. FIG. 2 differs from FIG. 1 only with respect to the support ring. Only the details of the support ring sets 50 will be discussed with reference to FIG. 2. FIG. 3 illustrates an expanded view of the support ring set of FIG. 2. The support ring set 50 is comprised of an inner ring 52 which has a bore 54 which is disposed around the outside surface of input shaft 12 and an outer surface 56 having an outer diameter and an outer ring 57 having a bore 58 which has a diameter greater than the diameter of the outer surface 56 of the inner ring 52 and has an outer surface 60 which rotatably supports the support shaft 22 of the planetary gear sets 20. While the invention is not limited thereto, preferably the inner ring 52 and outer ring 57 are metallic. Furthermore, it is preferred that the outer ring 57 has a lesser spring rate than the inner ring 52 which permits the outer ring to readily deflect radially inward upon the application of radially inward forces to the outside surface 60 as a consequence from radially inward loads being applied to the planetary gear sets 20. When the outer ring 57 has deflected radially inward to a position of contacting the inner ring, the inward deflection is substantially reduced for increasing radial loads because of the substantially greater thickness of the support ring set 50 bearing the radial inward load and the greater stiffness of the inner ring 52. The combination of the two support rings 52 and 57 provides a variable stiffness support for the shafts 22 for radially inward directed loads which has a first lesser rate of support (stiffness) as a consequence of deflection of the outer support ring 57 with a lesser spring rate and a higher rate of support when ring 57 is deflected radially inward into contact with inner support ring 52 as a consequence of the greater combined thickness of the inner and outer rings and the higher spring rate of the inner ring. The clearance between the outer surface 56 of the inner ring 52 and the bore 58 of the outer ring 57 is chosen to permit a desired degree of radial loading to be borne by the outer support ring 57 prior to the transfer of the loading substantially to the planetary gear teeth. The deflection of the outer ring 57 in response to radially inward loads applied to the planetary gear sets 20 precludes the application of high shear forces to the teeth of the planetary gear sets 22 which in the prior art caused damage. Accordingly, the invention minimizes the application of high forces to the teeth of the planetary gear sets 22 even when the geared actuator is set up to have minimal backlash between the teeth of the planetary gear sets 22 and the ring gears. A retaining ring 62 may be provided to maintain a substantially fixed axial relationship between the inner ring 52 and the outer ring 57. However, it should be understood that the invention is not limited thereto.

While the invention has been described in terms of its preferred embodiment, it should be understood that numerous modifications may be made thereto without departing from the spirit and scope of the invention as defined in the appended claims. It is intended that all such modifications fall within the scope of the appended claims. It should be understood that the present invention is not limited to the geared actuator disclosed herein. Furthermore, the invention may be used in other applications which do not include the combination of a sun gear, a plurality of planetary gear sets and a plurality of ring gears.

I claim:

1. A geared rotary actuator comprising:
    (a) an input shaft having a sun gear mounted thereon;
    (b) a first fixed ring gear having internally facing teeth;
    (c) a second fixed ring gear having internally facing teeth;
    (d) a third ring gear having internally facing teeth with the third ring gear being journalled for rotation;
    (e) a plurality of planetary gear sets each having first, second and third individual planetary gears mounted at spaced apart locations on a support shaft with the first ring gear having teeth engaging teeth of the first planetary gear of each of the planetary gear sets, the second ring gear having teeth engaging the teeth of the second planetary gear of each of the planetary gear sets, and the third ring gear having teeth engaging teeth of the third planetary gear of each of the planetary gear sets; and
    (f) a plurality of support ring sets with each ring set having an inner ring and an outer ring and each ring set being centrally disposed around the input shaft with at least one support ring set being disposed on each side of the sun gear, an outer surface of the outer ring of each support ring set rotatably supporting the support shafts of the planetary gear sets, and the outside diameter of the inner ring being less than an inside diameter of the outer ring.

2. A geared actuator in accordance with claim 1 further comprising:
    (a) output means, coupled to the third ring gear, for outputting motion of the third ring gear and wherein; and
    (b) the first and second ring gears have a first pitch diameter and the third ring gear has a second pitch diameter different than the first pitch diameter.

3. A geared actuator in accordance with claim 2 wherein:
    (a) the outer ring is metallic and has a first spring rate; and
    (b) the inner ring is metallic and has a second spring rate which is greater than the first spring rate.

4. A geared actuator in accordance with claim 3 further comprising:
    a retaining ring disposed between the inner and outer rings for maintaining an axial relationship between the inner and outer support rings.

5. A geared actuator in accordance with claim 4 further comprising:
    (a) one or more bearings rotatably supporting the third ring gear with each of the one or more bearings having a nominal clearance from the third ring gear; and wherein
    (b) the second planetary gears have a nominal backlash measured with respect to the second ring gear; and
    (c) the nominal backlash is less than the nominal clearance.

6. A support ring set, for use in an actuator in which at least a pair of support ring sets are centrally disposed around an input shaft having means for driving a plurality of planetary shafts radially disposed with respect to the input shaft with an outer surface of the support ring sets rotatably supporting the planetary shafts with each shaft having means for driving an output which is subject to radially inward loading which results in radially inward force being applied to the planetary shafts comprising:
    (a) an inner ring having a bore disposed around the input shaft and an outside surface having an outside diameter; and
    (b) an outer ring having a bore with a diameter which is greater than the outside diameter of the inner ring with an outer surface of the outer ring being the outer surface of the support ring set.

7. A support ring set in accordance with claim 6 wherein:
    (a) the outer ring has a spring rate less than a spring rate of the inner ring; and
    (b) the inner and outer rings are metallic.

8. A support ring set in accordance with claim 7 further comprising:
    a retaining ring disposed between the inner and outer rings for maintaining an axial relationship between the rings.

9. An actuator comprising:
    (a) a rotatably supported centrally disposed shaft;
    (b) a plurality of planetary shafts radially disposed about the centrally disposed shaft at circumferentially separated positions;
    (c) a plurality of support ring sets each having an inner ring having a bore disposed around the centrally disposed shaft and an outside surface with a diameter and an outer ring having a bore with a diameter larger than the diameter of the outside surface of the inner ring and an outside surface which rotatably supports the planetary shafts;
    (d) means, coupling the centrally disposed shaft to the planetary shafts, for transmitting torque therebetween; and
    (e) an output means, coupled to the planetary shafts, for outputting motion in response to relative motion between the centrally disposed shaft and the planetary shafts.

10. An actuator in accordance with claim 9 wherein:
    (a) the output means is mechanically coupled to the planetary shafts; and
    (b) input torque is applied to the centrally disposed shaft.

11. An actuator in accordance with claim 9 wherein:
    (a) the inner ring has a first spring rate; and
    (b) the outer ring has a second spring rate with the second spring rate being less than or equal to the first spring rate.

12. An actuator in accordance with claim 10 wherein:

(a) the output means is mechanically coupled to the planetary shafts; and
(b) input torque is applied to the centrally disposed shaft.

13. An actuator in accordance with claim 9 wherein:
a retaining ring is disposed between the inner and outer rings for maintaining an axial relationship between the rings.

14. An actuator in accordance with claim 10 wherein:
a retaining ring is disposed between the inner and outer rings for maintaining an axial relationship between the rings.

15. An actuator in accordance with claim 11 wherein:
a retaining ring is disposed between the inner and outer rings for maintaining an axial relationship between the rings.

16. An actuator in accordance with claim 12 wherein:
a retaining ring is disposed between the inner and outer rings for maintaining an axial relationship between the rings.

17. An actuator in accordance with claim 10 further comprising:
(a) one or more bearings rotatably supporting the output means with each of the one or more bearings having a nominal clearance from the output means and wherein;
(b) the output means has a backlash; and
(c) the backlash is less than the nominal clearance.

18. An actuator in accordance with claim 11 further comprising:
(a) one or more bearings rotatably supporting the output means with each of the one or more bearings having a nominal clearance from the output means and wherein;
(b) the output means has a backlash; and
(c) the backlash is less than the nominal clearance.

19. An actuator in accordance with claim 17 further comprising:
a retaining ring disposed between the inner and outer rings for maintaining an axial relationship between the rings.

* * * * *